US011586673B2

(12) United States Patent
Jin et al.

(10) Patent No.: US 11,586,673 B2
(45) Date of Patent: Feb. 21, 2023

(54) DATA WRITING AND READING METHOD AND APPARATUS, AND CLOUD STORAGE SYSTEM

(71) Applicant: Hangzhou Hikvision Digital Technology Co., Ltd., Hangzhou (CN)

(72) Inventors: Ping Jin, Hangzhou (CN); Qiqian Lin, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 563 days.

(21) Appl. No.: 15/999,307

(22) PCT Filed: Nov. 8, 2016

(86) PCT No.: PCT/CN2016/105094
§ 371 (c)(1),
(2) Date: Aug. 17, 2018

(87) PCT Pub. No.: WO2017/140131
PCT Pub. Date: Aug. 24, 2017

(65) Prior Publication Data
US 2019/0042659 A1     Feb. 7, 2019

(30) Foreign Application Priority Data

Feb. 17, 2016  (CN) .......................... 201610088973.4

(51) Int. Cl.
*G06F 16/00*         (2019.01)
*G06F 16/901*        (2019.01)
(Continued)

(52) U.S. Cl.
CPC .............. *G06F 16/901* (2019.01); *G06F 3/06* (2013.01); *G06F 3/0605* (2013.01); *G06F 3/067* (2013.01);
(Continued)

(58) Field of Classification Search
CPC ........ G06F 16/901; G06F 16/903; G06F 3/06; G06F 3/0605; G06F 3/0617; G06F 3/0635; G06F 3/067; G06F 11/1425
(Continued)

(56) References Cited

U.S. PATENT DOCUMENTS

2013/0336320 A1* 12/2013 Rangaraman ........... H04L 45/38
                                                       370/392
2014/0012995 A1*  1/2014 Zhang ................. H04L 41/0806
                                                       709/226
(Continued)

FOREIGN PATENT DOCUMENTS

| CN | 101827121 A | 9/2010 |
| CN | 102035865 A | 4/2011 |

(Continued)

OTHER PUBLICATIONS

International Search Report for International Application No. PCT/CN2016/105094 dated Feb. 14, 2017.

*Primary Examiner* — Alexandria Y Bromell
(74) *Attorney, Agent, or Firm* — Clements Bernard Walker

(57) ABSTRACT

A data writing and reading method and apparatus, and a cloud storage system. The data writing method includes an access node receiving a data write request, identifying domain identification information contained in the data write request when failing to obtain an available management node, and querying a pre-saved index according to the domain identification information, wherein the index includes a correspondence between a resource pool and domain identification information, identifying a target resource pool that matches the domain identification information, each resource pool including at least one storage server, determining, from at least one storage server included in the target resource pool, one of the storage (Continued)

servers as a target storage server, and writing data to be written into the target storage server, to ensure that the cloud storage system operates normally without additional cost when all management nodes are at fault or the management node cluster network is abnormal.

13 Claims, 4 Drawing Sheets

(51) Int. Cl.
    *G06F 3/06*       (2006.01)
    *G06F 16/903*    (2019.01)
    *G06F 11/14*     (2006.01)
    *G06F 11/30*     (2006.01)

(52) U.S. Cl.
    CPC .......... *G06F 3/0617* (2013.01); *G06F 3/0635* (2013.01); *G06F 11/1425* (2013.01); *G06F 11/3034* (2013.01); *G06F 16/903* (2019.01)

(58) Field of Classification Search
    USPC ........................................................ 707/812
    See application file for complete search history.

(56) References Cited

U.S. PATENT DOCUMENTS

| | | |
|---|---|---|
| 2014/0181116 A1 | 6/2014 | Wang |
| 2015/0379292 A1 | 12/2015 | Lewis |

FOREIGN PATENT DOCUMENTS

| | | |
|---|---|---|
| CN | 102594852 A | 7/2012 |
| CN | 102694860 A | 9/2012 |
| CN | 102714615 A | 10/2012 |
| CN | 103942112 A | 7/2014 |
| CN | 104331330 A | 2/2015 |
| CN | 104679611 A | 6/2015 |
| CN | 104901903 A | 9/2015 |

* cited by examiner

DATA WRITING AND READING METHOD AND APPARATUS, AND CLOUD STORAGE SYSTEM

The present application claims the priority to a Chinese Patent Application No. 201610088973.4, filed with the State Intellectual Property Office of the People's Republic of China on Feb. 17, 2016 and entitled "DATA WRITING AND READING METHOD AND APPARATUS, AND CLOUD STORAGE SYSTEM", which is incorporated herein by reference in its entirety.

TECHNICAL FIELD

The present application relates to the field of data processing technologies, and in particular, to a data writing and reading method and apparatus, and a cloud storage system.

BACKGROUND

Cloud storage is a new concept extended and developed from the concept of cloud computing, which is an emerging network storage technology. It refers to a system that integrates, by cluster application, network technology, or distributed file system, various types of storage devices in the network through application software to enable them to work cooperatively and provide functions of data storage and service access.

The cloud storage system is a distributed system with a master-slave architecture. The master node, that is, the management node, plays a vital role in the normal operation of the entire system. In the event that the management node is at fault, all services of the entire system cannot be performed normally. For example, when an access node in a cloud storage system receives a data write request, the access node needs to send the data write request to the management node, so that the management node allocates a corresponding storage server for the data write request.

However, when the management node is at fault, the management node will not respond to the data processing request sent by the access node, thus the data processing will fail.

The architecture of a video cloud storage system shown in FIG. 1 is taken as an example to describe the corresponding processing flow when failing to obtain an available management node. When failing to obtain an available video cloud storage management node (CVM, Cloud Video Manage) 130, the video cloud storage management node 130 will not respond to a data processing request sent by a video cloud storage access node (CVA, Cloud Video Access) 120. Therefore, the video cloud storage access node 120 will not receive a video cloud storage server (CVS, Cloud Video Storage) 140 allocated by the video cloud storage management node 130 for the data processing request, and the data processing will fail. The same problem exists for other cloud storage systems similar to the above video cloud storage system.

Therefore, in the actual operation of the cloud storage system, when the management node is at fault and the cloud storage system cannot provide services, data may be lost or data cannot be read, causing significant losses to users.

In the prior art, in order to ensure the stability of the cloud storage system, the main way is to increase the number of management nodes, and through HA (High Availability) or cluster technology to ensure that when some management nodes are at fault, normal management nodes takes over the task to continue to provide services, or add standby management nodes to replace the fault management nodes to provide services. However, adding management nodes or adding standby management nodes increases the project cost. Moreover, adding management nodes or adding standby management nodes can only ensure that the cloud storage system runs normally when some management nodes are at fault, and cannot guarantee that the cloud storage system is running normally in the event that all management nodes are at fault or the management node cluster network is abnormal.

SUMMARY

The purpose of the embodiments of the present application is to provide a data writing and reading method and apparatus, and a cloud storage system, so that the cloud storage system can still operate normally without adding additional cost in the event that all management nodes are at fault or the management node cluster network is abnormal. The specific technical solutions are as follows.

In a first aspect, an embodiment of the present application provides a data writing method based on a cloud storage system, wherein the cloud storage system includes at least: an access node, at least one management node, and at least one storage server, wherein the method includes:

the access node receiving a data write request;

identifying domain identification information contained in the data write request when failing to obtain an available management node, and querying a pre-saved index according to the domain identification information, the index includes a correspondence between a resource pool and domain identification information;

identifying a target resource pool that matches the domain identification information, wherein each resource pool includes at least one storage server;

determining, from the at least one storage server included in the target resource pool, one of the storage servers as a target storage server, and writing data to be written into the target storage server.

Further, determining one of the storage servers as a target storage server, includes:

obtaining a current load amount of each storage server;

identifying a storage server with the lowest current load amount as a target storage server.

Further, failing to obtain an available management node refers that each management node is at fault or a management node cluster network is abnormal.

Further, the process of building the index includes:

sending, to each management node, a request for obtaining a correspondence between each resource pool and domain identification information, and receiving the correspondence between each resource pool and domain identification information sent by each management node;

saving the correspondence between each resource pool and domain identification information in the index.

Further, the method further includes:

updating, at a set time interval, the correspondence between each resource pool and domain identification information saved in the index.

In a second aspect, an embodiment of the present application provides a data reading method based on a cloud storage system which is applicable to a query platform, wherein the cloud storage system includes at least: at least one management node and at least one storage server, wherein the method includes:

receiving a data read request;

querying a pre-saved index when failing to obtain an available management node, wherein the index includes a correspondence between each storage server and its IP address;

sending, according to an IP address of each storage server, a request for obtaining attribute information of data to each server, and receiving the attribute information of the data saved by each storage server which is returned by the storage server;

determining at least one target storage server according to the received attribute information of the data stored by each storage server and attribute information of data to be read contained in the data read request, and reading corresponding data from each target storage server.

Further, the index further includes status information of each storage server indicating whether each storage server is online, and sending, according to an IP address of each storage server, a request for obtaining attribute information of data to each storage server, includes:

identifying a storage server in an online state according to the status information of each storage server;

sending, according to the IP address of a storage server in the online state, a request for obtaining attribute information of data to each corresponding storage server in the online state.

Further, failing to obtain an available management node refers that each management node is at fault or a management node cluster network is abnormal.

Further, the process of building the index includes:

sending, to each management node, a request for obtaining a correspondence between each storage server and an IP address, and receiving the correspondence between each storage server and an IP address sent by each management node;

saving the correspondence between each storage server and an IP address in the index.

Further, the method further includes:

updating, at a set time interval, the correspondence between each storage server and an IP address saved in the index.

In a third aspect, an embodiment of the present application provides a data writing apparatus based on a cloud storage system which is applicable to the access node, wherein the cloud storage system includes at least: an access node, at least one management node, and at least one storage server, wherein the apparatus includes:

a receiving module, configured for receiving a data write request;

a processing module, configured for identifying domain identification information contained in the data write request when failing to obtain an available management node, and querying a pre-saved index according to the domain identification information, the index includes a correspondence between a resource pool and domain identification information;

an identification module, configured for identifying a target resource pool that matches the domain identification information, wherein each resource pool includes at least one storage server; and a write module, configured for determining, from the at least one storage server included in the target resource pool, one of the storage servers as a target storage server, and writing data to be written into the target storage server.

Further, the writing module is configured for:

obtaining a current load amount of each storage server;

identifying a storage server with the lowest current load amount as a target storage server.

Further, failing to obtain an available management node refers that each management node is at fault or a management node cluster network is abnormal.

Further, the apparatus further includes:

an execution module, configured for sending, to each management node, a request for obtaining a correspondence between each resource pool and domain identification information, and receiving the correspondence between each resource pool and domain identification information sent by each management node;

a saving module, configured for saving, the correspondence between each resource pool and domain identification information in the index.

Further, the apparatus further includes:

an updating module, configured for updating, at a set time interval, the correspondence between each resource pool and domain identification information saved in the index.

In a fourth aspect, an embodiment of the present application provides a data reading apparatus based on a cloud storage system which is applicable to a query platform, wherein the cloud storage system includes at least: at least one management node and at least one storage server, wherein the apparatus includes:

a receiving module, configured for receiving a data read request;

a querying module, configured for querying a pre-saved index when failing to obtain an available management node, wherein the index includes a correspondence between each storage server and its IP address;

a processing module, configured for sending, according to an IP address of each storage server, a request for obtaining attribute information of data to each storage server, and receiving the attribute information of the data saved by each storage server which is returned by each storage server;

a reading module, configured for determining at least one target storage server according to the received attribute information of the data stored by each storage server and attribute information of data to be read contained in the data read request, and reading corresponding data from each target storage server.

Further, the index further includes status information of each storage server indicating whether each storage server is online, and the processing module includes:

an identification submodule, configured for identifying a storage server in an online state according to the status information of each storage server;

a processing submodule, configured for sending, according to the IP address of a storage server in the online state, a request for obtaining attribute information of data to each corresponding storage server in the online state.

Further, failing to obtain an available management node refers that each management node is at fault or a management node cluster network is abnormal.

Further, the apparatus further includes:

an execution module, configured for sending, to each management node, a request for obtaining a correspondence between each storage server and an IP address, and receiving the correspondence between each storage server and an IP address sent by each management node;

a saving module, configured for saving the correspondence between each storage server and an IP address in the index.

Further, the apparatus further includes:

an updating module, configured for updating, at a set time interval, the correspondence between each storage server and an IP address saved in the index.

In a fifth aspect, an embodiment of the present application provides a cloud storage system, wherein the cloud storage system includes the apparatus disposed in an access node as described in the foregoing third aspect, and at least one storage server.

In a sixth aspect, the present application provides a storage medium, wherein the storage medium is used to store executable program code, the executable program code is configured to perform the data writing method based on a cloud storage system described in the present application when being executed.

In a seventh aspect, the present application provides a storage medium, wherein the storage medium is used to store executable program code, the executable program code is configured to perform the data reading method based on a cloud storage system described in the present application when being executed.

In an eighth aspect, the present application provides an application program, wherein the application program is configured to perform the data writing method based on a cloud storage system described in the present application when being executed.

In a ninth aspect, the present application provides an application program, wherein the application program is configured to perform the data reading method based on a cloud storage system described in the present application when being executed.

In a tenth aspect, the present application provides an access node device, including:

a processor, a memory, a communication interface and a bus;

the processor, the memory and the communication interface being connected and completing communication with each other via the bus;

the memory storing executable program code;

the processor runs a program corresponding to the executable program code by reading the executable program code stored in the memory for performing the data writing method based on a cloud storage system described in the present application.

In an eleventh aspect, the present application provides an electronic device, including:

a processor, a memory, a communication interface and a bus;

the processor, the memory and the communication interface being connected and completing communication with each other via the bus;

the memory storing executable program code;

the processor runs a program corresponding to the executable program code by reading the executable program code stored in the memory for performing the data reading method based on a cloud storage system described in the present application.

The embodiments of the present application provide a data writing and reading method and apparatus, and a cloud storage system. The data writing method includes: the access node receiving a data write request; identifying domain identification information contained in the data write request when failing to obtain an available management node, and querying a pre-saved index according to the domain identification information, wherein the index includes a correspondence between a resource pool and domain identification information; identifying a target resource pool that matches the domain identification information, wherein each resource pool includes at least one storage server; determining, from at least one storage server included in the target resource pool, one of the storage servers as a target storage server, and writing data to be written into the target storage server. The embodiments of the present application can ensure that the cloud storage system can still operate normally without adding additional cost when all management nodes are at fault or the management node cluster network is abnormal.

BRIEF DESCRIPTION OF THE DRAWINGS

In order to describe the technical solutions of embodiments of the present application and of the prior art more clearly, a simple introduction of the drawings required in the description of the embodiments and of the prior art will be given. Obviously, the drawings described below are just for some embodiments of the present application and other drawings may be obtained by those of ordinary skills in the art based on these drawings without any creative effort.

DETAILED DESCRIPTION

In order to enable a person skilled in the art to better understand the technical solutions in the embodiments of the present application, the technical solutions in the embodiments of the present application are clearly and completely described in the following with reference to the accompanying drawings in the embodiments of the present application. It is apparent that the described embodiments are only a part of the embodiments of the present application, and not all of them. Based on the embodiments of the present application, all other embodiments obtained by those of ordinary skill in the art without making creative work are within the scope of this application.

It should be noted that the embodiments in the present application and the features in the embodiments may be combined with each other without conflict. The present application will be described in detail below with reference to the accompanying drawings.

Figure 3:
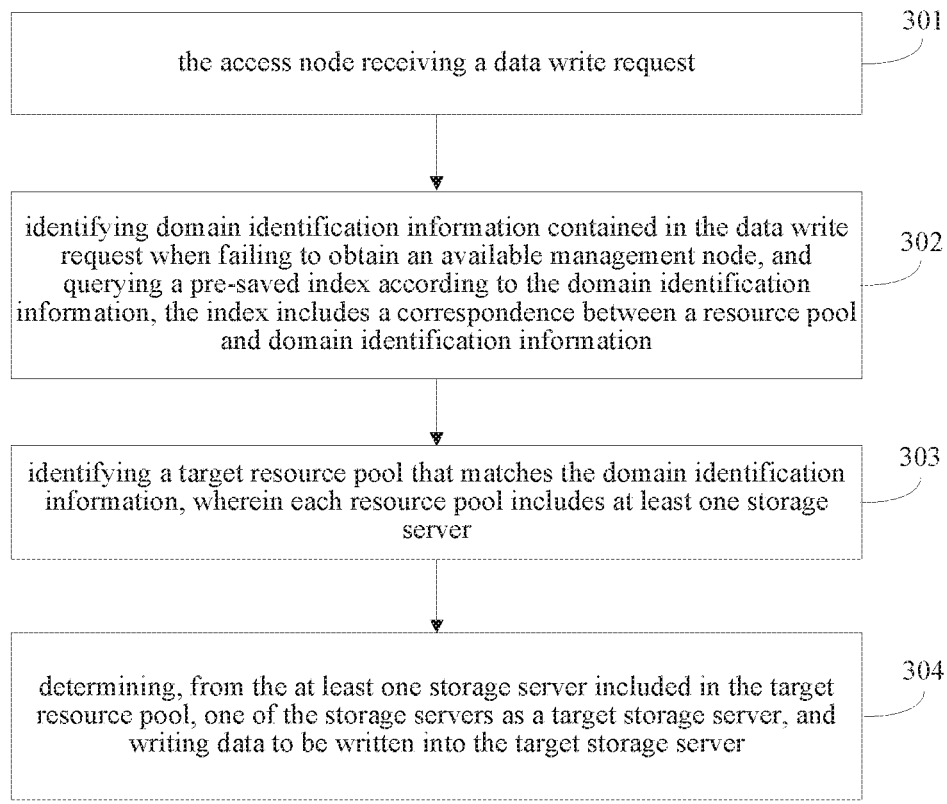
FIG. 3 is a data writing method based on a cloud storage system according to an embodiment of the present application.

FIG. 3 is a data writing method based on a cloud storage system according to an embodiment of the present application, including the following steps:

Step 301: an access node receiving a data write request.

In general, the cloud storage system may include at least: an access node, at least one management node, and at least one storage server. The access node may be configured to receive a data write request and send the data write request to the management node, such that the management node allocates a corresponding storage server for the data write request. The access node may further process the corresponding data in the data write request according to the storage server allocated by the management node for the data write request.

In this embodiment, when the cloud storage system performs data writing, the access node may first receive a data write request and then write the corresponding data.

Figure 1:
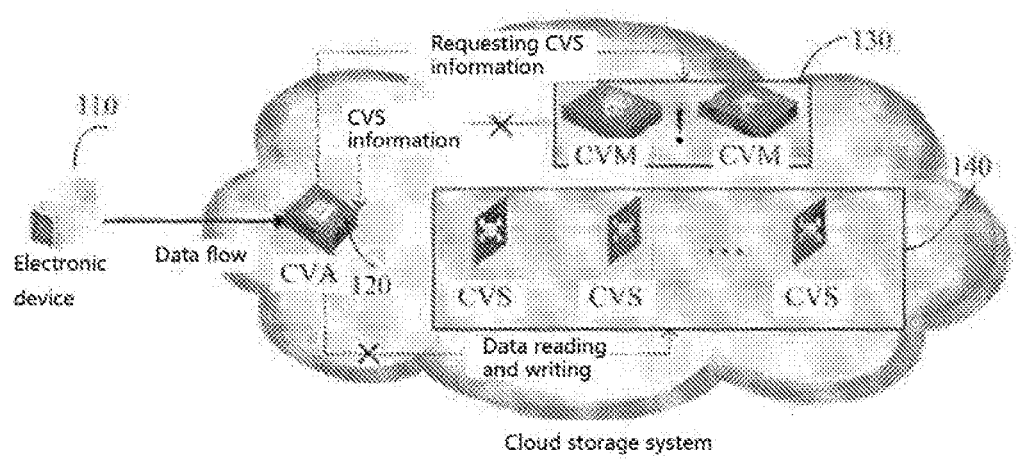
FIG. 1 is a schematic diagram of a cloud storage system unable to provide services when failing to obtain a management node.
Figure 2:
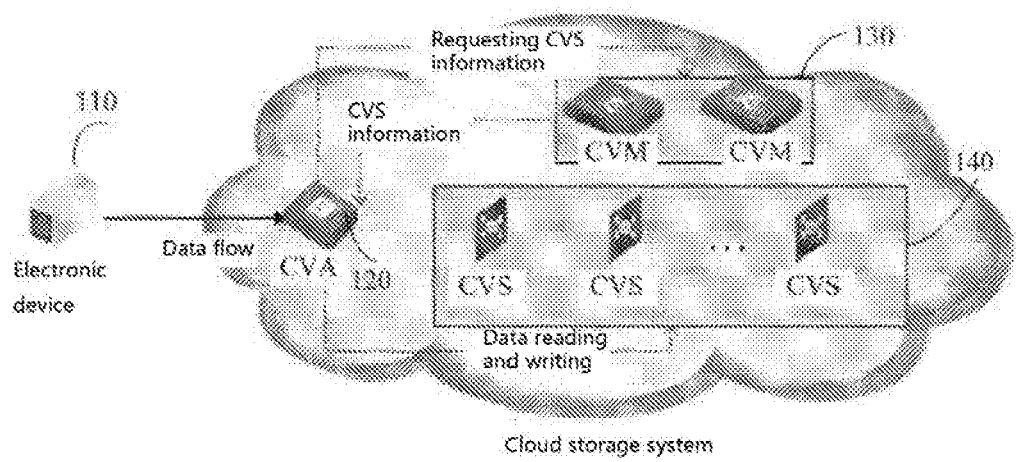
FIG. 2 is a schematic flow diagram of a cloud storage system processing a data request under normal conditions.

The architecture of a video cloud storage system shown in FIG. 2 is taken as an example to describe the process of processing data requests by the cloud storage system under normal conditions. As shown in FIG. 2, an electronic device 110 may send a data processing request to a video cloud storage access node (CVA) 120, when the access node 120 receives a data processing request, the access node 120 needs to send the data processing request to a management node (CVM) 130 to cause the management node 130 to allocate a corresponding storage server (CVS) 140 for the data processing request. After the management node 130 allocates the corresponding storage server 140 for the data processing request, the allocation result may be fed back to the access node 120. The access node 120 can perform corresponding data processing, such as data reading and writing operations, based on the allocated storage server 140.

Step 302: identifying domain identification information included in the data write request when failing to obtain an available management node, and querying a pre-saved index according to the domain identification information, wherein the index includes a correspondence between a resource pool and the domain identification information.

In a cloud storage system, a plurality of storage servers may be generally included. To facilitate the management of a plurality of storage servers, a resource pool may be established, wherein each resource pool may include at least one storage server. Each resource pool may have a corresponding domain identification information.

When the access node receives a data write request, the data write request usually includes domain identification information, that is, the domain identification information of a resource pool where a storage server into which the data is to be written is located, so that the access node may allocate a corresponding storage server for the data write request based on the domain identification information.

Normally, when receiving a data write request, the access node may send the data write request to the management node, so that the management node allocates a corresponding storage server for the data write request. However, when failing to obtain an available management node, the access node will not be able to obtain a storage server allocated for the data write request through the management node.

Therefore, in this embodiment, an index containing a correspondence between a resource pool and the domain identification information may be saved in advance. When receiving a data write request and failing to obtain an available management node, the access node may identify the domain identification information in the data write request, and query the pre-saved index containing a correspondence between a resource pool and the domain identification information according to the domain identification information, to identify a target resource pool that matches the domain identification information.

Step 303: identifying a target resource pool that matches the domain identification information, wherein each resource pool includes at least one storage server.

In the embodiment of the present application, after identifying the domain identification information contained in the data write request, the access node may search for a correspondence between each resource pool and the domain identification information saved in the index, to identify a resource pool corresponding to the domain identification information contained in the data write request, and the identified resource pool is used as a target resource pool to process the data write request based on the target resource pool.

Step 304: determining, from at least one storage server included in the target resource pool, one of the storage servers as a target storage server, and writing the data to be written into the target storage server.

After identifying the target resource pool corresponding to the domain identification information contained in the data write request, the access node may further determine, from the at least one storage server contained in the target resource pool, one of the storage servers as a target storage server to write the data to be written into the target storage server.

For example, any one of the at least one storage server contained in the target resource pool may be selected as the target storage server.

Alternatively or additionally, in order to ensure load balancing of each storage server, when selecting a target storage server in the target resource pool, one can first obtain the current load amount of each storage server, and then identify a storage server with the smallest current load amount among all storage servers as the target storage server.

For example, when the cloud storage system is a video cloud storage system, a large amount of video data can be stored in the video cloud storage system. Specifically, a video capture system can write the collected real-time video data into the video cloud storage system.

In order to facilitate management of video data in a video cloud storage system, the video data collected by the same video capture system is stored in a fixed storage server of the video cloud storage system. The fixed storage server forms a resource pool, and the resource pool corresponds to a domain identification information. And when the read/write operation is configured, the address information of the video processing device of the fixed storage server is accessed.

When the access node receives a video write request and cannot obtain an available management node, it may first identify the domain identification information contained in the video write request, and identify the target resource pool that matches the domain identification information according to the domain identification information and the correspondence between the resource pool and the domain identification information saved in the index. Finally, one of the storage servers may be determined as a target storage server from the information of the at least one storage server contained in the target resource pool, and the video data is written into the target storage server.

Preferably, in order to ensure load balancing of each storage server, when selecting a target storage server for storing video data, one can first obtain the current load amount of each storage server, and then identify a storage server with the smallest current load amount as the target storage server.

In an implementation, when selecting a target storage server, the access node may send, to each storage server in the target resource pool, a request for obtaining its current load amount, and obtain the current load amount of each storage server according to the response message returned by each storage server. Then, a storage server with the smallest current load amount can be taken as the target storage server.

In another implementation, the access node may save the load amount corresponding to each storage server in the index during the process of building the index. When selecting a target storage server, the access node can query the load amount of each storage server in the target resource pool saved in the index, and select a storage server with the smallest load amount as the target storage server. Moreover, optionally, after the access node writes the data to be written into the target storage server, the load amount corresponding to this target storage server saved in the index may be updated.

In the method provided by the embodiment of the present application, through pre-saving the index containing a correspondence between a resource pool and the domain identification information, when receiving a data write request and failing to obtain an available management node, one can identify domain identification information contained in the data write request, and then identify, according to the domain identification information and the correspondence between a resource pool and the domain identification information saved in the index, a target resource pool that matches the domain identification information; finally, determine, from the at least one storage server contained in the target resource pool, one of the storage servers as a target storage server, to write data into the target storage server, which can ensure that the cloud storage system can still write data normally without data loss when all management nodes are at fault or the management node cluster network is abnormal.

Figure 4:
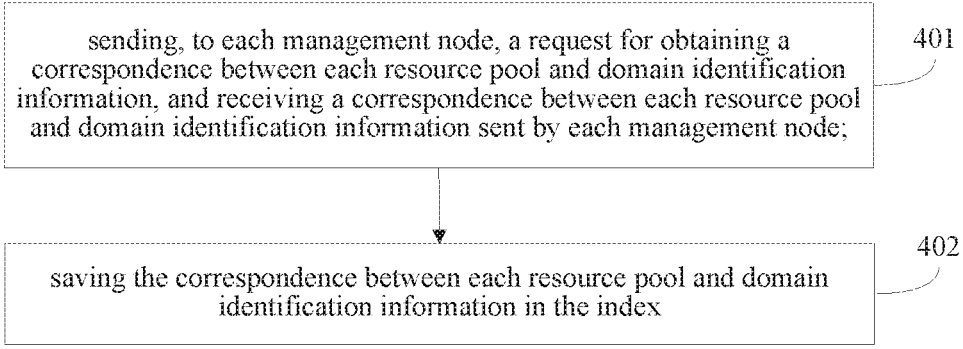
FIG. 4 is a method for building an index according to an embodiment of the present application.

Based on the foregoing embodiment of the present application, FIG. 4 is a method for building an index according to the embodiment of the present application, which may include the following steps:

Step 401: sending, to each management node, a request for obtaining a correspondence between each resource pool and domain identification information, and receiving a correspondence between each resource pool and domain identification information sent by each management node.

In a cloud storage system, management nodes play a vital role in the normal operation of the entire system. When receiving a data write request, the management node needs to allocate a storage server for the data write request based on the attribute information of each storage server to write the corresponding data. When the management node cannot be obtained, the attribute information of each storage server cannot be obtained. Therefore, a corresponding storage server cannot be allocated for the data write request, and thus data writing may fail.

Therefore, in this embodiment, in order to ensure that the cloud storage system can still provide normal services when failing to obtain an available management node, an index containing a correspondence between each resource pool and domain identification information may be pre-built to still obtain attribute information of each storage server when failing to obtain an available management node. Further, based on the attribute information of each storage server, a corresponding storage server is allocated for the data write request to ensure that the cloud storage system operates normally.

Specifically, the access node may send, to each management node, a request for obtaining a correspondence between each resource pool and domain identification information, and receive a correspondence between each resource pool and domain identification information sent by each management node.

Step 402: saving, in an index, the correspondence between each resource pool and domain identification information.

After the correspondence between each resource pool and domain identification information is obtained, the correspondence between each resource pool and domain identification information can be saved in the index, so that when receiving a data write request and failing to obtain an available management node, a target resource pool corresponding to the data write request is determined according to the correspondence between each resource pool and domain identification information saved in the index, and the data write request is processed based on the target resource pool.

Optionally, the correspondence between each resource pool and domain identification information may change. Therefore, in order to ensure the correctness of the correspondence between each resource pool and domain identification information saved in the index, the foregoing steps 401 and 402 may be performed according to the set time interval (for example, 2 hours, 12 hours, 24 hours, etc.), to update the correspondence between each resource pool and domain identification information saved in the index.

In the method provided by the embodiment of the present application, through pre-building an index containing a correspondence between each resource pool and domain identification information, when receiving a data write request and failing to obtain an available management node, at least one target resource pool corresponding to the data write request may be determined according to the index, and a target storage server is determined based on the target resource pool to write the corresponding data, thereby ensuring that the cloud storage system still operates normally when all management nodes are at fault or the management node cluster network is abnormal.

Figure 5:
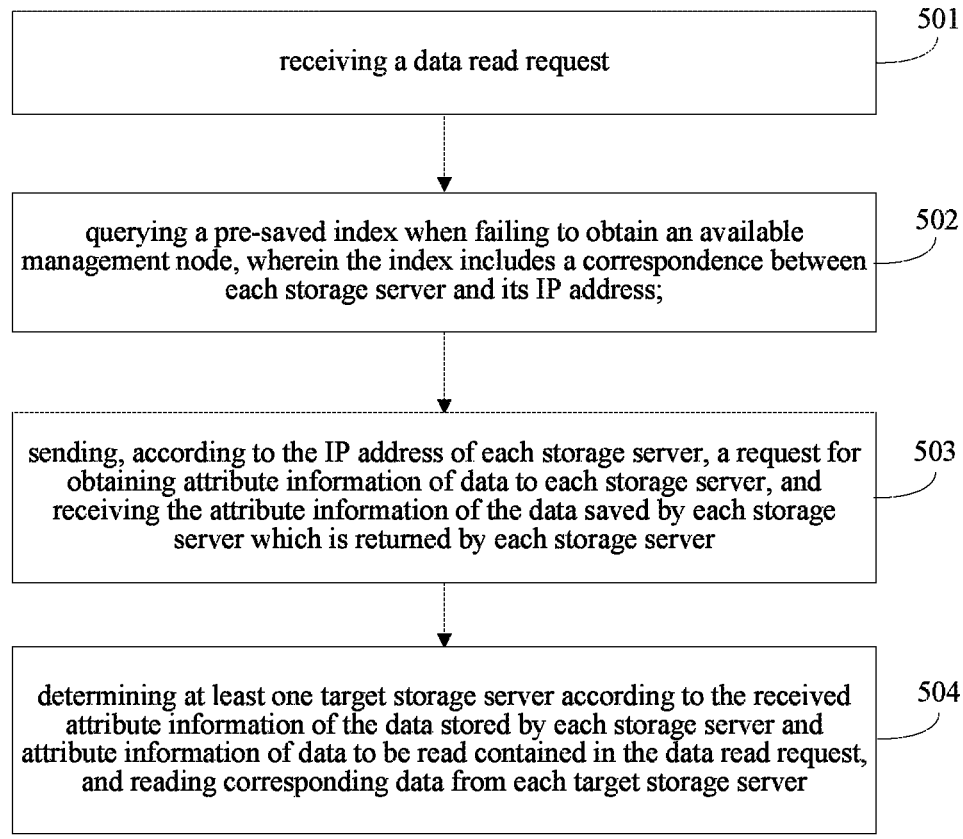
FIG. 5 is a data reading method based on a cloud storage system according to an embodiment of the present application.

FIG. 5 is a data reading method based on a cloud storage system according to an embodiment of the present application, which is applicable to a query platform, and may include the following steps:

Step 501: receiving a data read request.

In this embodiment, when the query platform performs data reading, it may first receive a data read request and read the corresponding data.

Step 502: querying a pre-saved index when failing to obtain an available management node, wherein the index includes a correspondence between each storage server and its IP address.

Normally, when receiving a data read request, the query platform may send the data read request to the management node, so that the management node allocates a corresponding storage server for the data read request. However, when failing to obtain an available management node, the query platform will not be able to obtain the storage server allocated for the data read request through the management node.

Therefore, in this embodiment, an index containing a correspondence between each storage server and its IP address may be saved in advance. When receiving a data read request and failing to obtain an available management node, the query platform can query the index to obtain an IP address of each storage server.

Step 503: sending, according to an IP address of each storage server, a request for obtaining attribute information of the data to each storage server, and receiving attribute information of the data saved by each storage server which is returned by each storage server.

After obtaining an IP address of each storage server, the query platform may send, according to an IP address of each storage server, a request for obtaining attribute information of the data to each storage server, and receive attribute information of the data saved by each storage server which is returned by each storage server.

The attribute information of the foregoing data may include keywords of data stored in each storage server. For example, when the data stored in a storage server is a road real-time monitoring video, the attribute information may be road segment information, time information, or the like.

The query platform may receive attribute information of the data saved by each storage server, and determine a storage server where the data to be read is located based on the attribute information, and read corresponding data from the corresponding storage server.

It can be understood that in a plurality of storage servers of the cloud storage system, for each storage server, it may be at fault, so this storage server may be offline. In this case, when the query platform sends to this storage server a request for obtaining attribute information of the data saved therein, this storage server may not return a response message. Therefore, when there is a storage server in an offline state, the query platform sending to each storage server a request for obtaining attribute information of the data saved therein may cause waste of resources.

Therefore, optionally, in the embodiment of the present application, status information of each storage server that indicates whether each storage server is online may be saved in the index of the query platform. In this case, the query platform may first identify a storage server in an online state according to the state information of each storage server, and then send, according to an IP address of the storage server in the online state, a request for obtaining the attribute information of the data to each corresponding storage server in the online state.

By saving the state information of each storage server in the index and sending the request for obtaining the attribute information of the data only to the storage server in the online state according to the state information of each storage server, network resources can be saved.

Step 504: determining at least one target storage server according to the received attribute information of the data stored by each storage server and the attribute information of the data to be read contained in the data read request, and reading the corresponding data from each target storage server.

After receiving the attribute information of the data saved by each storage server, the query platform may determine at least one target storage server according to the attribute information of the data stored by each storage server and the attribute information of the data to be read contained in the data read request.

The data read request received by the query platform usually includes attribute information of the data to be read. Therefore, after receiving the attribute information of the data saved by each storage server, the query platform may identify a storage server corresponding to the attribute information of the data to be read contained in the data read request, and take the identified storage server as the target storage server to read corresponding data from the target storage server.

For example, when the cloud storage system is a video cloud storage system, a large amount of video data can be stored in the video cloud storage system, and the user can read the desired video data from the video cloud storage system. Specifically, when traffic monitoring video data is stored in the video cloud storage system, the user can read corresponding video data of the corresponding time segment or the corresponding road segment.

When the query platform receives a data read request sent by a video processing device through the platform, the data read request carries the attribute information of the video data to be read, and the attribute information may be, for example, time period information and/or road segment information. The query platform is provided with an interface that interacts with the platform, and a data read request sent by the platform can be received through the interface.

When the query platform receives a data read request and fails to obtain an available management node, it queries the pre-saved index, wherein the index includes a correspondence between each storage server and its IP address, for example, reading video data of 9:00-10:00. Then, the query platform may determine, according to the pre-built index, each storage server corresponding to the IP address, and send a request for obtaining attribute information of the video data to each storage server, and receive a video clip of the corresponding time period saved and returned by each storage server. Finally, the querying platform may determine at least one target storage server according to the received video clip saved and returned by each storage server and the attribute information of the video data to be read contained in the video data read request. The information of the target storage server is sent to the query platform, and the query platform queries the corresponding target storage server, and reads the video data of the corresponding time period from the target storage server.

In the method provided by this embodiment, through pre-saving an index containing a correspondence between each storage server and its IP address, when receiving a data read request and failing to obtain an available management node, one can query the pre-saved index to obtain an IP address of each storage server, and then send, according to an IP address of each storage server, a request for obtaining attribute information of the data to each storage server, and receive attribute information of the data saved by each storage server which is returned by each storage server, finally, determine at least one target storage server according to the received attribute information of the data stored by each storage server and the attribute information of the data to be read contained in the data read request, to read corresponding data from the target storage server, which can ensure that the cloud storage system can still provide data reading services when all management nodes are at fault or the management node cluster network is abnormal.

Figure 6:
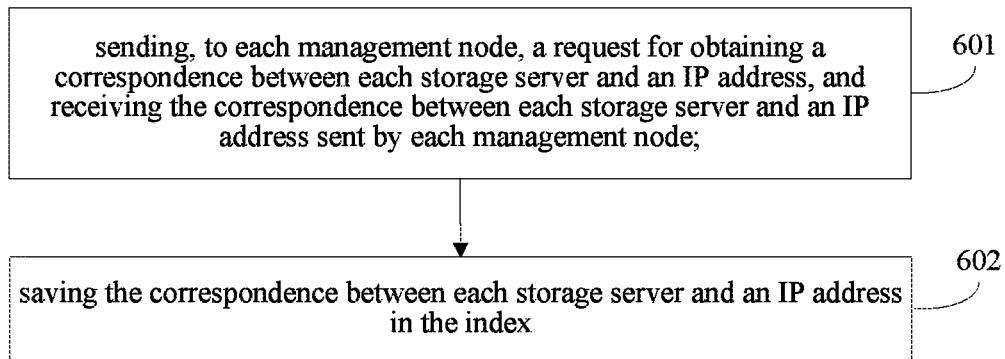
FIG. 6 is another method for building an index according to an embodiment of the present application.

Based on the foregoing embodiment of the present application, FIG. 6 is another method for building an index according to the embodiment of the present application, which may include the following steps:

Step 601: sending, to each management node, a request for obtaining a correspondence between each storage server and an IP address, and receiving a correspondence between each storage server and an IP address sent by each management node.

In a cloud storage system, management nodes play a vital role in the normal operation of the entire system. When receiving a data read request, the management node needs to allocate a storage server for the data read request based on the attribute information of each storage server to read the corresponding data. When the management node cannot be obtained, the attribute information of each storage server cannot be obtained. Therefore, a corresponding storage server cannot be allocated for the data read request, and thus data reading may fail.

Therefore, in this embodiment, in order to ensure that the cloud storage system can still provide normal services when failing to obtain an available management node, the query platform can pre-build an index containing a correspondence between each storage server and an IP address, so that the attribute information of each storage server can still be obtained when failing to obtain an available management node. Further, based on the attribute information of each storage server, a corresponding storage server is allocated for the data read request to ensure that the cloud storage system operates normally.

Specifically, the query platform may send, to each management node, a request for obtaining a correspondence between each storage server and an IP address, and receive a correspondence between each storage server and an IP address sent by each management node.

Step 602: saving the correspondence between each storage server and an IP address in an index.

After obtaining the correspondence between each storage server and an IP address, the query platform may store the correspondence between each storage server and an IP address in the index, so that the query platform may send a request for obtaining attribute information of the data to each storage server according to the correspondence between each storage server and an IP address saved in the index when receiving a data read request and failing to obtain an management node, and determine, according to the response message returned by each storage server, a target storage server corresponding to the data read request, and read the corresponding data based on the target storage server.

Optionally, the correspondence between each storage server and an IP address may change. Therefore, in order to ensure the correctness of the correspondence between the each storage server and an IP address saved in the index, the query platform may perform the foregoing steps 601 and 602 according to a set time interval (for example, 2 hours, 12 hours, 24 hours, etc.), to update the correspondence between each storage server and an IP address saved in the index.

In the method provided by this embodiment, through pre-building a index containing a correspondence between each storage server and an IP address, when receiving a data read request and failing to obtain an available management node, at least one target storage server corresponding to the data read request may be determined according to the index, and the corresponding data is read based on the target storage server, thereby ensuring that the cloud storage system still operates normally when all management nodes are at fault or the management node cluster network is abnormal.

Figure 7:
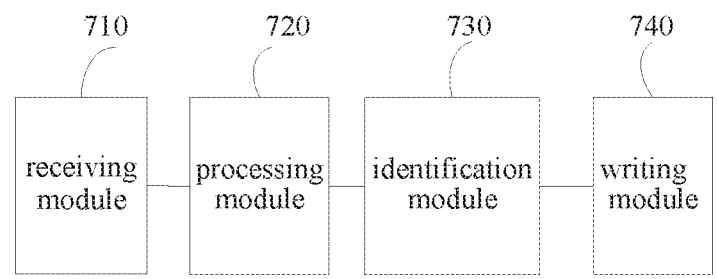
FIG. 7 is a data writing apparatus based on a cloud storage system according to an embodiment of the present application.

FIG. 7 is a data writing apparatus based on a cloud storage system according to an embodiment of the present application, which can include:

a receiving module 710, configured for receiving a data write request;

a processing module 720, configured for identifying domain identification information contained in the data write request when failing to obtain an available management node, and querying a pre-saved index according to the domain identification information, wherein the index includes a correspondence between a resource pool and domain identification information;

an identification module 730, configured for identifying a target resource pool that matches the domain identification information, wherein each resource pool includes at least one storage server; and a write module 740, configured for determining, from at least one storage server included in the target resource pool, one of the storage servers as a target storage server, and writing the data contained in the data write request into the target storage server.

In the apparatus provided by the embodiment of the present application, through pre-saving an index containing a correspondence between a resource pool and domain identification information, when receiving a data write request and failing to obtain an available management node, one can identify the domain identification information contained in the data write request, and then identify, according to the domain identification information, and the correspondence between a resource pool and domain identification information saved in the index, a target resource pool that matches the domain identification information; finally, determine, from the at least one storage server included in the target resource pool, one of the storage servers as a target storage server, to write data into the target storage server, which can ensure that the cloud storage system can still write data normally without data loss when all management nodes are at fault or the management node cluster network is abnormal.

Further, the writing module 740 is configured for:
obtaining a current load amount of each storage server;
identifying a storage server with the lowest current load amount as a target storage server.

Further, failing to obtain an available management node refers that each management node is at fault or the management node cluster network is abnormal.

Further, the apparatus further includes:
an execution module (not shown in the figures), configured for sending, to each management node, a request for obtaining a correspondence between each resource pool and domain identification information, and receiving a correspondence between each resource pool and domain identification information sent by each management node;
a saving module (not shown in the figures), configured for saving, in an index, the correspondence between each resource pool and domain identification information.

Further, the apparatus further includes:
an updating module (not shown in the figures), configured for updating, at a set time interval, the correspondence between each resource pool and domain identification information saved in the index.

Through pre-building an index containing a correspondence between each resource pool and domain identification information, when receiving a data write request and failing to obtain an available management node, at least one target resource pool corresponding to the data write request may be determined according to the index, and a target storage server is determined based on the target resource pool to write the corresponding data, thereby ensuring that the cloud storage system still operates normally when all management nodes are at fault or the management node cluster network is abnormal.

Figure 8:
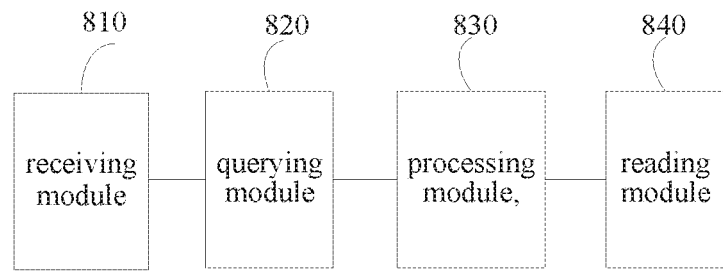
FIG. 8 is a data reading apparatus based on a cloud storage system according to an embodiment of the present application.

FIG. 8 is a data reading apparatus based on a cloud storage system according to an embodiment of the present application, which is applicable to a query platform, and may include:

a receiving module 810, configured for receiving a data read request;

a querying module 820, configured for querying a pre-saved index when failing to obtain an available management node, wherein the index includes a correspondence between each storage server and its IP address;

a processing module 830, configured for sending, according to an IP address of each storage server, a request for obtaining attribute information of data to each storage server, and receiving attribute information of the data saved by each storage server which is returned by each storage server;

a reading module 840, configured for determining at least one target storage server according to the received attribute information of the data stored by each storage server and attribute information of data to be read contained in the data read request, and reading corresponding data from each target storage server.

In the apparatus provided by this embodiment, through pre-saving an index containing a correspondence between each storage server and its IP address, when receiving a data read request and failing to obtain an available management node, one can query the pre-saved index to obtain an IP address of each storage server, and then send, according to an IP address of each storage server, a request for obtaining attribute information of data to each storage server, and receive attribute information of the data saved by each storage server which is returned by each storage server, finally, determine at least one target storage server according to the received attribute information of the data stored by each storage server and attribute information of data to be read contained in the data read request, to read corresponding data from the target storage server, which can ensure that the cloud storage system can still provide data reading services when all management nodes are at fault or the management node cluster network is abnormal.

Further, the index further includes status information of each storage server that indicates whether each storage server is online, and the processing module 830 includes:

an identification submodule (not shown in the figures), configured for identifying a storage server in an online state according to status information of each storage server;

a processing submodule (not shown in the figures), configured for sending, according to an IP address of a storage server in an online state, a request for obtaining attribute information of data to each corresponding storage server in an online state.

Further, failing to obtain an available management node refers that each management node is as fault or the management node cluster network is abnormal.

Further, the apparatus further includes:

an execution module (not shown in the figures), configured for sending, to each management node, a request for obtaining a correspondence between each storage server and an IP address, and receiving a correspondence between each storage server and an EP address sent by each management node;

a saving module (not shown in the figures), configured for saving the correspondence between each storage server and an IP address in an index.

Further, the apparatus further includes:

an updating module (not shown in the figures), configured for updating, at a set time interval, the correspondence between each storage server and an IP address in the index.

Through pre-building an index containing a correspondence between each storage server and an IP address, when receiving a data read request and failing to obtain an available management node, at least one target storage server corresponding to the data read request may be determined according to the index, and corresponding data is read based on the target storage server, thereby ensuring that the cloud storage system still operates normally when all management nodes are at fault or the management node cluster network is abnormal.

In another aspect, an embodiment of the present application further provides a cloud storage system, wherein the cloud storage system includes the apparatus disposed in an access node as provided in the embodiment shown in FIG. 7, and at least one storage server.

The cloud storage system provided by the embodiment of the present application can ensure that the cloud storage system can still operate normally without adding additional cost when all management nodes are at fault or the management node cluster network is abnormal.

Correspondingly, the present application further provides a storage medium, wherein the storage medium is used to store executable program code, the executable program code is configured to perform the data writing method based on a cloud storage system described in the present application when being executed. In the data writing method based on a cloud storage system described in the present application, the cloud storage system includes at least: an access node, at least one management node, and at least one storage server, wherein the method includes:

the access node receiving a data write request;

identifying domain identification information contained in the data write request when failing to obtain an available management node, and querying a pre-saved index according to the domain identification information, the index includes a correspondence between a resource pool and domain identification information;

identifying a target resource pool that matches the domain identification information, wherein each resource pool includes at least one storage server;

determining, from at least one storage server included in the target resource pool, one of the storage servers as a target storage server, and writing the data to be written into the target storage server.

In the embodiment of the present application, through pre-saving an index containing a correspondence between a resource pool and domain identification information, when receiving a data write request and failing to obtain an available management node, one can identify domain identification information contained in the data write request, and then identify, according to the domain identification information, and the correspondence between a resource pool and domain identification information saved in the index, a target resource pool that matches the domain identification information; finally, determine, from the at least one storage server included in the target resource pool, one of the storage servers as a target storage server, to write data into the target storage server, which can ensure that the cloud storage system can still write data normally without data loss when all management nodes are at fault or the management node cluster network is abnormal.

Correspondingly, the present application further provides a storage medium, wherein the storage medium is used to store executable program code, the executable program code is configured to perform the data reading method based on a cloud storage system described in the present application when being executed. In the data reading method based on a cloud storage system provided by the present application which is applicable to a query platform, the cloud storage system includes at least: at least one management node and at least one storage server, wherein the method includes:

receiving a data read request;

querying a pre-saved index when failing to obtain an available management node, wherein the index includes a correspondence between each storage server and its IP address;

sending, according to an IP address of each storage server, a request for obtaining attribute information of data to each storage server, and receiving attribute information of the data saved by each storage server which is returned by each storage server;

determining at least one target storage server according to the received attribute information of the data stored by each storage server and attribute information of data to be read contained in the data read request, and reading the corresponding data from each target storage server.

In the embodiment of the present application, through pre-saving an index containing a correspondence between each storage server and its IP address, when receiving a data read request and failing to obtain an available management node, one can query the pre-saved index to obtain an IP address of each storage server, and then send, according to an IP address of each storage server, a request for obtaining attribute information of data to each storage server, and receive attribute information of the data saved by each storage server which is returned by each storage server, finally, determine at least one target storage server according to the received attribute information of the data stored by each storage server and attribute information of data to be read contained in the data read request, to read the corresponding data from each target storage server, which can ensure that the cloud storage system can still provide data reading services when all management nodes are at fault or the management node cluster network is abnormal.

Correspondingly, the present application further provides an application program, wherein the application program is configured to perform the data writing method based on a cloud storage system described in the present application when being executed. In the data writing method based on a cloud storage system described in the present application, the cloud storage system includes at least: an access node, at least one management node, and at least one storage server, wherein the method includes:

the access node receiving a data write request;

identifying domain identification information contained in the data write request when failing to obtain an available management node, and querying a pre-saved index according to the domain identification information, the index includes a correspondence between a resource pool and domain identification information;

identifying a target resource pool that matches the domain identification information, wherein each resource pool includes at least one storage server;

determining, from at least one storage server included in the target resource pool, one of the storage servers as a target storage server, and writing the data to be written into the target storage server.

In the embodiment of the present application, through pre-saving an index containing a correspondence between a resource pool and domain identification information, when receiving a data write request and failing to obtain an available management node, one can identify the domain identification information contained in the data write request, and then identify, according to the domain identification information, and the correspondence between a resource pool and domain identification information saved in the index, a target resource pool that matches the domain identification information; finally, determine, from the at least one storage server included in the target resource pool, one of the storage servers as a target storage server, to write data into the target storage server, which can ensure that the cloud storage system can still write data normally without data loss when all management nodes are at fault or the management node cluster network is abnormal.

Correspondingly, the present application further provides an application program, wherein the application program is configured to perform the data reading method based on a cloud storage system described in the present application when being executed. In the data reading method based on a cloud storage system provided by the present application which is applicable to a query platform, the cloud storage system includes at least: at least one management node and at least one storage server, wherein the method includes:

receiving a data read request;

querying a pre-saved index when failing to obtain an available management node, wherein the index includes a correspondence between each storage server and its IP address;

sending, according to an IP address of each storage server, a request for obtaining attribute information of data to each storage server, and receiving attribute information of the data saved by each storage server which is returned by each storage server;

determining at least one target storage server according to the received attribute information of the data stored by each storage server and attribute information of data to be read contained in the data read request, and reading the corresponding data from each target storage server.

In the embodiment of the present application, through pre-saving an index containing a correspondence between each storage server and its IP address, when receiving a data read request and failing to obtain an available management node, one can query the pre-saved index to obtain an IP address of each storage server, and then send, according to an IP address of each storage server, a request for obtaining attribute information of data to each storage server, and receive attribute information of the data saved by each storage server which is returned by each storage server, finally, determine at least one target storage server according to the received attribute information of the data stored by each storage server and attribute information of data to be read contained in the data read request, to read the corresponding data from each target storage server, which can ensure that the cloud storage system can still provide data reading services when all management nodes are at fault or the management node cluster network is abnormal.

Correspondingly, the present application further provides an access node device, including:

a processor, a memory, a communication interface and a bus;

the processor, the memory and the communication interface being connected and completing communication with each other via the bus;

the memory storing executable program code;

the processor runs a program corresponding to the executable program code by reading the executable program code stored in the memory for performing the data writing method based on a cloud storage system described in the present application. In the data writing method based on a cloud storage system described in the present application, the cloud storage system includes at least: an access node, at least one management node, and at least one storage server, wherein the method includes:

the access node receiving a data write request;

identifying domain identification information contained in the data write request when failing to obtain an available management node, and querying a pre-saved index according to the domain identification information, the index includes a correspondence between a resource pool and domain identification information;

identifying a target resource pool that matches the domain identification information, wherein each resource pool includes at least one storage server;

determining, from at least one storage server included in the target resource pool, one of the storage servers as a target storage server, and writing the data to be written into the target storage server.

In the embodiment of the present application, through pre-saving an index containing a correspondence between a resource pool and domain identification information, when receiving a data write request and failing to obtain an available management node, one can identify the domain identification information contained in the data write request, and then identify, according to the domain identification information, and the correspondence between a resource pool and domain identification information saved in the index, a target resource pool that matches the domain identification information; finally, determine, from the at least one storage server included in the target resource pool, one of the storage servers as a target storage server, to write data into the target storage server, which can ensure that the cloud storage system can still write data normally without data loss when all management nodes are at fault or the management node cluster network is abnormal.

Correspondingly, the present application provides an electronic device, including:

a processor, a memory, a communication interface and a bus;

the processor, the memory and the communication interface being connected and completing communication with each other via the bus;

the memory storing executable program code;

the processor runs a program corresponding to the executable program code by reading the executable program code stored in the memory for performing the data reading method based on a cloud storage system described in the present application. In the data reading method based on a cloud storage system provided by the present application which is applicable to a query platform, the cloud storage system includes at least: at least one management node and at least one storage server, wherein the method includes:

receiving a data read request;

querying a pre-saved index when failing to obtain an available management node, wherein the index contains a correspondence between each storage server and its IP address;

sending, according to an IP address of each storage server, a request for obtaining attribute information of data to each storage server, and receiving attribute information of the data saved by each storage server which is returned by each storage server;

determining at least one target storage server according to the received attribute information of the data stored by each storage server and attribute information of data to be read contained in the data read request, and reading the corresponding data from each target storage server.

In the embodiment of the present application, through pre-saving an index containing a correspondence between each storage server and its IP address, when receiving a data read request and failing to obtain an available management node, one can query the pre-saved index to obtain an IP address of each storage server, and then send, according to an IP address of each storage server, a request for obtaining attribute information of data to each storage server, and receive attribute information of the data saved by each storage server which is returned by each storage server, finally, determine at least one target storage server according to the received attribute information of the data stored by each storage server and attribute information of data to be read contained in the data read request, to read the corresponding data from each target storage server, which can ensure that the cloud storage system can still provide data reading services when all management nodes are at fault or the management node cluster network is abnormal.

For the apparatus/storage medium/application program/access node device/electronic device embodiment, since it is basically similar to the method embodiment, the description is relatively simple, and the relevant parts can be referred to the description of the method embodiment.

It should be noted that, the relationship terms herein such as "first", "second" and the like are only used to distinguish one entity or operation from another entity or operation, but do not necessarily require or imply that there is an actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

The embodiments in the specification are all described in related manners, and the same or similar parts among the embodiments may refer to each other, and each embodiment focuses on the difference from other embodiments. In particular, for the apparatus embodiment, since it is basically similar to the method embodiment, the description is relatively simple, and the relevant parts can be referred to the description of the method embodiment.

It will be understood by those of ordinary skill in the art that all or some of the steps in the method described above may be accomplished by a program to instruct an associated hardware. Said program may be stored in a computer-readable storage medium, such as ROM/RAM, magnetic disks, optical disks, etc.

The above description is only the preferred embodiments of the present application and is not intended to limit the protection scope of the present application. Any amendments, equivalent substitutions, improvements etc. made within the spirit and principle of the present application are all included in the protection scope of the present application.

What is claimed is:

1. A data writing method based on a cloud storage system comprising at least: an access node, at least one management node, and at least one resource pool, each of which comprises at least one storage server, wherein the method comprises:

the access node receiving a data write request;

identifying, by the access node, domain identification information contained in the data write request when the at least management node is at fault or a management node cluster network is abnormal, wherein the at least management node is at least one node for receiving the data write request from the access node and allocating a corresponding storage server for the data write request, and querying, by the access node, a pre-saved index according to the domain identification information, wherein the index comprises a correspondence between a resource pool and domain identification information;

identifying, by the access node, a target resource pool that matches the domain identification information;

determining, by the access node, from the at least one storage server contained in the target resource pool, one of the storage servers as a target storage server, and writing data to be written into the target storage server.

2. The method of claim 1, wherein determining one of the storage servers as a target storage server comprises:

obtaining a current load amount of each storage server;

identifying a storage server with a lowest current load amount as a target storage server.

3. The method of claim 1, wherein the process of building the index comprises:

sending, to each management node, a request for obtaining a correspondence between each resource pool and domain identification information, and receiving the correspondence between each resource pool and domain identification information sent by each management node;

saving the correspondence between each resource pool and domain identification information in the index.

4. The method of claim 3, further comprising:

updating, at a set time interval, the correspondence between each resource pool and domain identification information saved in the index.

5. A data reading method based on a cloud storage system comprising at least: at least one management node and at least one storage server, wherein the method is applicable to a query platform and comprises:

receiving, by the query platform, a data read request;

querying, by the query platform, a pre-saved index when the at least management node is at fault or a management node cluster network is abnormal, wherein the at least management node is at least one node for receiving the data read request from the query platform and allocating a corresponding storage server for the data read request, and the index comprises a correspondence between each storage server and its IP address;

sending, by the query platform, according to an IP address of each storage server, a request for obtaining attribute information of data to each storage server, and receiving the attribute information of the data saved by each storage server which is returned by each storage server;

determining, by the query platform, at least one target storage server according to the received attribute information of the data stored by each storage server and attribute information of data to be read contained in the data read request, and reading corresponding data from each target storage server.

6. The method of claim 5, wherein the index further comprises status information of each storage server indicating whether each storage server is online, and sending, according to an IP address of each storage server, a request for obtaining attribute information of data to each storage server, comprises:

identifying a storage server in an online state according to the status information of each storage server;

sending, according to an IP address of a storage server in the online state, a request for obtaining attribute information of data to each corresponding storage server in the online state.

7. The method of claim 5, wherein the process of building the index comprises:

sending, to each management node, a request for obtaining a correspondence between each storage server and an IP address, and receiving the correspondence between each storage server and an IP address sent by each management node;

saving the correspondence between each storage server and an IP address in the index.

8. The method of claim 5, further comprising:

updating, at a set time interval, the correspondence between each storage server and an IP address saved in the index.

9. A cloud storage system, comprising an apparatus for performing the data writing method based on a cloud storage system of claim 1, and at least one storage server.

10. A non-transitory storage medium, wherein the non-transitory storage medium is used to store executable program code, and the executable program code is used to perform the data writing method based on a cloud storage system of claim 1 when being executed.

11. A non-transitory storage medium, wherein the non-transitory storage medium is used to store executable program code, and the executable program code is used to perform the data reading method based on a cloud storage system of claim 5 when being executed.

12. An access node apparatus, comprising:

a processor, a memory, a communication interface and a bus;

the processor, the memory and the communication interface being connected and completing communication with each other via the bus;

the memory storing executable program code;

the processor runs a program corresponding to the executable program code by reading the executable program code stored in the memory for performing the data writing method based on a cloud storage system comprising at least: an access node, at least one management node, and at least one resource pool, each of which comprises at least one storage server, wherein the method comprises:

the access node receiving a data write request identifying, by the access node, domain identification information contained in the data write request when the at least management node is at fault or a management node cluster network is abnormal, wherein the at least management node is at least one node for receiving the data write request from the access node and allocating a corresponding storage server for the data write request, and querying, by the access node, a pre-saved index according to the domain identification information, wherein the index comprises a correspondence between a resource pool and domain identification information;

identifying, by the access node, a target resource pool that matches the domain identification information;

determining, by the access node, from the at least one storage server contained in the target resource pool, one of the storage servers as a target storage server, and writing data to be written into the target storage server.

13. An electronic device, comprising:

a processor, a memory, a communication interface and a bus;

the processor, the memory and the communication interface being connected and completing communication with each other via the bus;

the memory storing executable program code;

the processor runs a program corresponding to the executable program code by reading the executable program code stored in the memory for performing the data reading method based on a cloud storage system comprising at least: at least one management node and at least one storage server, wherein the method is applicable to a query platform and comprises:

receiving, by the query platform, a data read request querying, by the query platform, a pre-saved index when the at least management node is at fault or a management node cluster network is abnormal, wherein the at least management node is at least one node for receiving the data read request from the query platform and allocating a corresponding storage server for the data read request, and the index comprises a correspondence between each storage server and its IP address;

sending, by the query platform, according to an IP address of each storage server, a request for obtaining attribute information of data to each storage server, and receiving the attribute information of the data saved by each storage server which is returned by each storage server;

determining, by the query platform, at least one target storage server according to the received attribute information of the data stored by each storage server and attribute information of data to be read contained in the data read request, and reading corresponding data from each target storage server.

* * * * *